United States Patent [19]
Carroll

[11] Patent Number: 5,624,214
[45] Date of Patent: Apr. 29, 1997

[54] ADJUSTABLE DRILL BIT EXTENSION

[76] Inventor: Stuart Carroll, 3823 Pueblo Ave., Santa Barbara, Calif. 93110

[21] Appl. No.: 573,183

[22] Filed: Dec. 15, 1995

[51] Int. Cl.$^6$ .................................................. B23B 31/36
[52] U.S. Cl. .................. 408/226; 279/105.1; 403/106; 408/239 R
[58] Field of Search .................................. 408/141, 226, 408/238, 239 R, 239 A, 240; 279/143, 145, 105.1; 403/104, 106, 109

[56] References Cited

U.S. PATENT DOCUMENTS

| | | | |
|---|---|---|---|
| 918,062 | 4/1909 | King | 279/142 |
| 1,028,126 | 6/1912 | Meredith | 279/105.1 |
| 1,225,209 | 5/1917 | Beaulieu | 279/105.1 |
| 1,376,139 | 4/1921 | Del Porto | 279/105.1 |
| 1,414,110 | 4/1922 | Bocchio | 279/105.1 |
| 2,752,965 | 7/1956 | Mackey | 408/226 |
| 4,076,444 | 2/1978 | Liebrecht | 408/226 |
| 4,474,513 | 10/1984 | Salyers | 408/146 |

*Primary Examiner*—Daniel W. Howell
*Attorney, Agent, or Firm*—Michael G. Petit

[57] ABSTRACT

An extendible tool holder having one end adapted for attachment to the shank of a drill bit and the other end adapted for attachment to a spindle. The tool holder includes an elongate shaft portion having a hexagonal cross-section slideably disposed within a sleeve portion. Each face of the shaft portion has a plurality of ball detent rests in the for of circular indentations therein. The distance of the detent rests from the end of the shaft are different from one another on adjacent faces of the shaft. Staggering the detent rest spacing by deploying the detent rests on adjacent faces of the shaft enables adjustable extension of the tool holder without sacrificing structural integrity. A hollow cylindrical sleeve having ball detents therewithin and a spring-loaded ball detent releasing collet thereupon slides telescopically over the shaft. The sleeve portion has a lumen having a hexagonal cross-section therewithin and coextensive therewith which matingly accommodates the hexagonal shaft portion of the tool holder as well as the shank of a tool. The hexagonal cross-section of the exterior of the shaft portion, together with the hexagonal lumen of the sleeve portion provides structural integrity during high torque operations. In a preferred embodiment, the tool holder is suited for extendibly attaching a drill bit to a drill chuck. One end of the hexagonal shaft portion is held within a drill spindle. The opposite end of the shaft projects into one end of the hexagonal lumen within the sleeve portion. The shank of a drill bit extends into the other end of the lumen and is held securely thereby. The shaft portion and sleeve portion are telescopically adjusted to space the drill bit a preferred distance from the drill spindle.

4 Claims, 2 Drawing Sheets

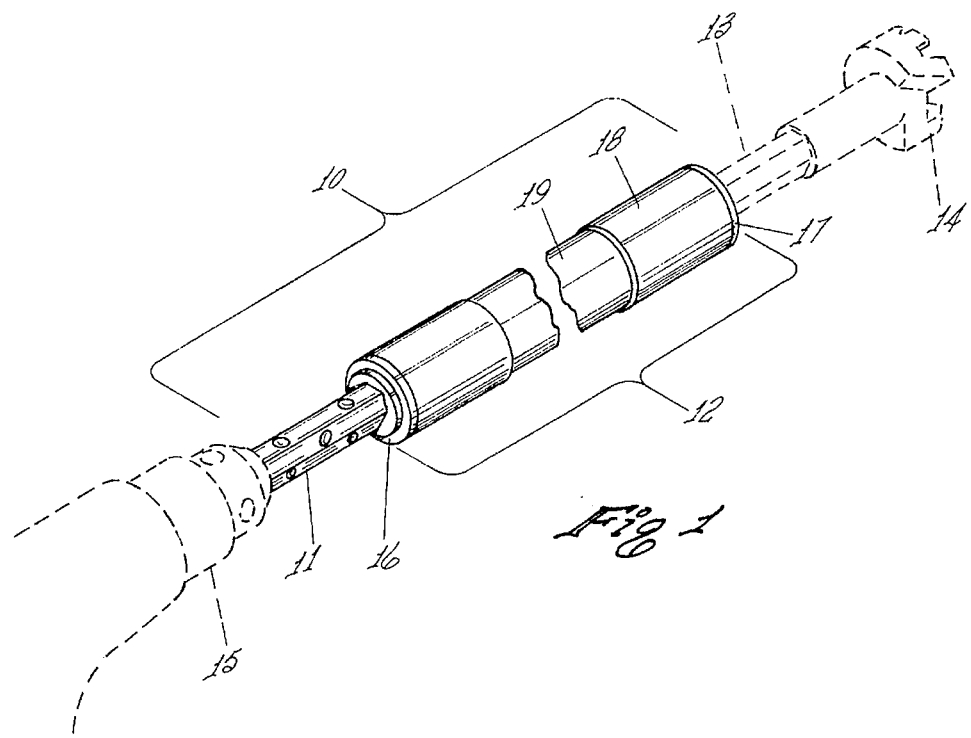
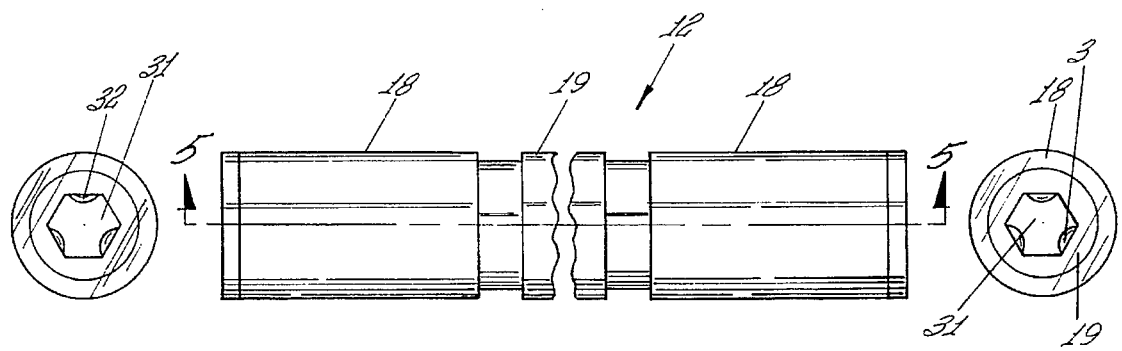
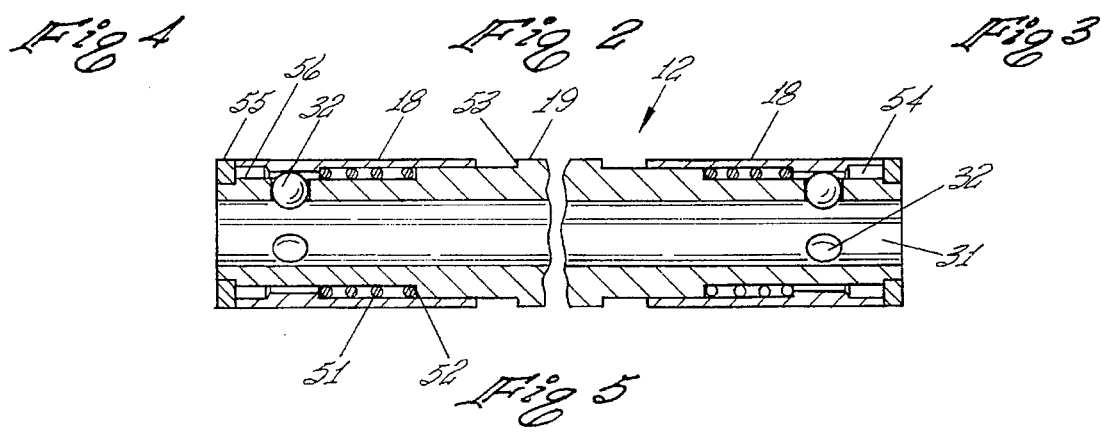

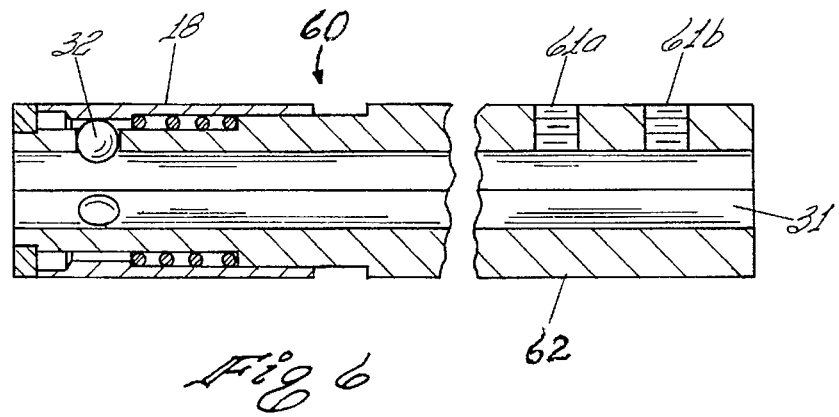
Fig 6
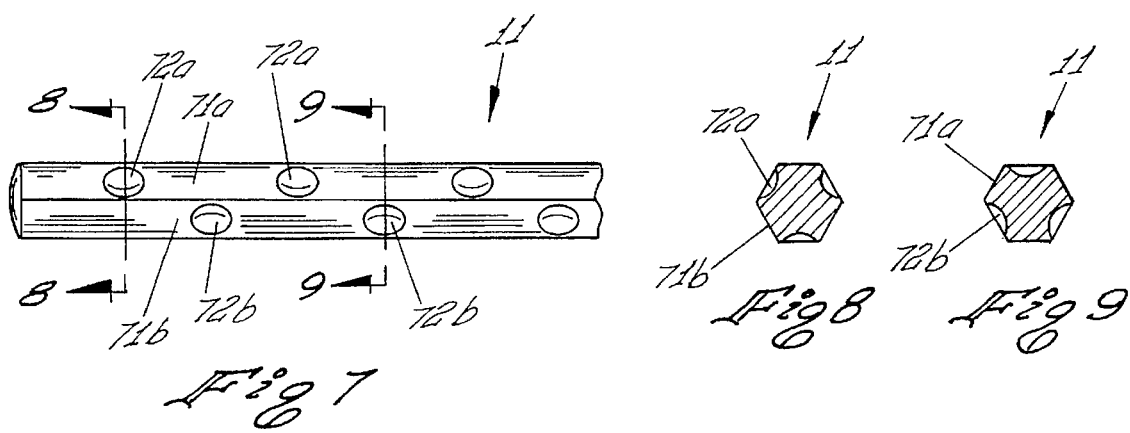
Fig 7
Fig 8
Fig 9
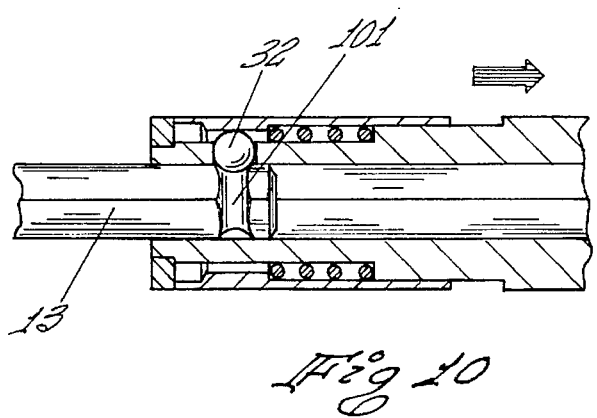
Fig 10

ADJUSTABLE DRILL BIT EXTENSION

BACKGROUND OF THE INVENTION

1. Field of the Invention

This invention relates to a tool and, more particularly, to an adjustable length drill bit extension.

2. Prior Art

Extendible tool attachments for use with hand drills and the like are well known in the art. Extendible tool holders are required, for example, when it is necessary to drill a hole through a stud or a pair of studs wherein the space available for inserting the drill and the bit may be restricted and the material thickness is greater than the length of the drill bit. In such instances, it is common to select one of a plurality of fixed-length drill bits from a set, each drill bit in the set having a different shank length. As a further example, circular hole cutting bits having a large (one to two inch) outer diameter have a shaft attached axially thereto, which shaft has a proximal end adapted to be received and securely held within a chuck or spindle of a drill, are commercially available in a variety of shank lengths.

Notwithstanding the current commercial availability of drill bits having various shank lengths, it is particularly desirable to have a single drill bit with a variable shank-length wherein the drill bit is operable for drilling a hole having a variable depth and a single preferred diameter through a varied thickness of material such as wood. The drill bit should preferable have a telescopically axially adjustable shank length so that it can drill through various thickness' of wood. Such drill bit extensions have been disclosed in the art as shown, for example, in U.S. Pat. Nos. 1,376,139; 918,062; and 1,225,209.

While such adjustable drill bit extensions are known, the use of such extendible shafts is limited because the adjustable shank-length construction does not permit high torque applications. That is, the extension potion of the shank of prior art devices employs a cylindrical shaft telescopically mounted within the cylindrical bore of a sleeve. Such a tool fails upon application of high torque. It is therefore desirable to provide an extendible shaft or shank for a drill bit wherein the shank construction permits the use of the bit in a high torque application.

SUMMARY OF THE INVENTION

It is a first object of this invention to provide an extendible tool operable for varying the distance of a drill bit from the nosepiece of a drill operable for high torque applications.

It is a further object of this invention to provide an extensible tool having one end adapted to quickly and releasably receive and hold the shank of a drill bit, and the other end adapted to fit within the chuck or spindle of a drill.

It is still a further object of this invention to provide an elongate extensible tool having a distal end with means thereon operable for quick release and/or attachment to the shank of a drill bit thereon and a proximal end adapted to engage the spindle of a drill.

The features of the invention believed to be novel are set forth with particularity in the appended claims. However, the invention itself both as to organization and method of operation, together with further objects and advantages thereof may best be understood by reference to the following description taken in conjunction with the accompanying drawings in which:

BRIEF DESCRIPTION OF THE DRAWINGS

FIG. 1 is a broken perspective view of the extendible drill bit adapter of the present invention.

FIG. 2 is a broken side elevational view of the outer sleeve of the adapter tool shown in FIG. 1.

FIG. 3 is an end on view of the outer sleeve of FIG. 2 viewed from the right.

FIG. 4 is an end on view of the outer sleeve of FIG. 2 viewed from the left.

FIG. 5 is a broken longitudinal cross-sectional view of the outer sleeve of the adapter wherein both ends of the outer sleeve portion of the adapter have quick release tool engagement means thereon.

FIG. 6 is a broken longitudinal cross-sectional view of an embodiment of the outer sleeve of the adapter where in one end adapted to receive a tool employing set screws and the other end being a quick release.

FIG. 7 is a fragmentary plan view of the shaft portion of the adapter of the present invention.

FIG. 8 is a cross-sectional view of the shaft portion of the adapter assembly along section line 8—8 of FIG. 7.

FIG. 9 is a cross-sectional view of the shaft portion of the adapter along section line 9—9 of FIG. 7.

FIG. 10 is a fragmentary longitudinal partial cross-sectional view of the adapter assembly having the tool inserted into the quick release end thereof.

DESCRIPTION OF THE PREFERRED EMBODIMENT

FIG. 1 illustrates, in a broken perspective view, a tool assembly including the adjustable shank extension of the present invention. The general arrangement of the tool assembly shown in FIG. 1 provides means for attaching a tool 14, shown in phantom, to a spindle or chuck 15 on a drill (also shown in phantom) in a manner which allows the tool 14 to be quickly removed from the assembly 10. The assembly 10 provides adjustable means for varying the distance between the tool 14 and the drill spindle 15. The assembly 10 includes a shaft portion 11 adapted to fit within the nose piece or spindle 15 of a (prior art) drill. The shaft portion 11 comprises an elongate solid member having a generally hexagonal cross-section. The shaft portion 11 is slideably mounted within a sleeve portion 12. The sleeve portion 12 has a central lumen coextensive therewith having a female hexagonal cross-section dimensioned to snugly receive the shaft portion 11 therewithin. The sleeve portion 12 comprises an inner sleeve 19 preferably having collets 18 coaxial therewith and slideably mounted on either end thereof which collets 18 serve to releasably engage the shaft portion 11 and the shank 13 of a drill 14.

Turning now to FIG. 2, illustrating the sleeve portion 12 of the assembly 10 in broken elevational view, the sleeve portion 12 comprises a concentric telescopically a mounted collet member 18 having a cylindrical cross-section end mounted to permit axial movement of the collet member 18 with respect to the inner sleeve 19 of the sleeve portion 12. FIG. 3 shows an end on view of the sleeve portion 12 from the right of FIG. 2 (the tool end 17) of the sleeve portion 12. The collet 18 surrounds the inner sleeve 19 of the sleeve portion 12. The hexagonal lumen 31 within the inner sleeve 19 has projecting radially thereinto a plurality of detent balls 32. FIG. 4 is an end on view from the left (drill end 16) of the sleeve portion 12 of the assembly 10 of FIG. 2.

FIG. 5 shows a broken longitudinal cross-sectional view of the sleeve portion 12 of the assembly 10 of the present invention. The sleeve portion 12 comprises an elongate inner sleeve 19 having a cylindrical outer surface and hexagonal central lumen 31 coextensive therewith. At least one collet 18 comprising a cylindrical tubing coaxially and slideably mounted thereupon. A spring 51 is deployed within a second depression of the outer diameter of the inner sleeve 19 between the collet 18 and the inner sleeve 19. One end of the spring 51 abuts a ledge 52 on the second depression of the outer diameter of the inner sleeve 19. The opposite end of the spring 51 abuts a ledge on the inner surface of the collet 18 urging the collet 18 toward the ends of the sleeve portion 12. A c-ring 55 or the like is affixed to the end 8 of the inner sleeve 19 to prevent the spring-tensioned collet 18 from advancing there beyond.

A detent ball 32 projects into the inner lumen 31 of the inner sleeve 19. When the collet 18 is retracted towards the center of the sleeve portion 12 of the assembly 10 against the tension of the spring, the detent ball 32 falls out of the inner lumen 31 into a recess 56 within the collet 18 sleeve. With the Collet 18 retracted to position, the detent ball 32 within the recess 56 within the collet 18 a shaft (not shown in FIG. 5) may be introduced into and advanced through the inner lumen 31 until an appropriate detent rest (number 72 on shaft portion 11 of FIG. 7) engages the detent ball 32. The collet 18 is then released wherein the spring 51 pushes or urges the collet 18 sleeve laterally thereby pressing the detent ball 32 into the detent rest 72 and holding it securely therewithin.

FIG. 6 shows an embodiment of a sleeve portion 60 similar the sleeve portion 12 of FIG. 5 except that the inner sleeve 62 has only one collet. The opposite end of the sleeve 62 employs set screws 61 to engage the shaft of a tool (not shown) advanced within the lumen 31 of the inner sleeve 62.

Turning now to FIG. 7, the shaft portion 11 of the assembly 10, is shown in fragmentary longitudinal elevation. The shaft portion 11 comprises a solid elongate member having hexagonal cross-section. The outer surface of the shaft portion 11 comprises six flat faces, each face being adjacent to two other faces. The adjacent two faces 71a and 71b have semispherical recesses therewithin which are dimensioned to matingly engage a portion of a ball detent 32 within the sleeve portion 12 of the assembly 10. The holes 72a and 72b on adjacent faces 71a and 71b are longitudinally staggered with respect to their distance from the end of the shaft portion 11. Thus, depending upon the angular orientation the shaft portion 11, when the shaft portion 11 is inserted within the sleeve portion 12, a particular set of detent rests 72 are available engage the ball detents 32 in the sleeve portion 12 to establish the preferred overall length of the assembly 10. If, in the event that one particular orientation of the shaft portion 11 within the sleeve portion 12 does not provide a suitable overall length, the shaft portion 11 may be removed, rotated 60 degrees and reinserted into the sleeve portion 12. Thus, a different set of detent rests engages the detent providing overall lengths intermediate between the overall lengths available in the first instance. This is seen more clearly in FIGS. 8 and 9 which are cross-sectional views of the shaft 11 through section line 8—8 and 9—9 respectively. It is seen that the detent holes 72a and 72b are spaced along the shaft to provide alternate overall lengths for the assembly 10. If detent holes were placed close together on the same face the construction would compromise structural integrity of the assembly. Placing intermediate detent rests on adjacent shaft faces enables a nearly continuous availability of overall lengths. The hexagonal cross-section of the shaft/sleeve assembly confers further strength to the assembly over a cylindrical assembly which relies solely on the detent to prevent rotation of the shaft relative to the sleeve. Further, polygons (having more sides) provide greater selection of available lengths although reducing the allowable diameter of a detent rest. For example, a hexagonal cross-section for the shaft and axial lumen of the outer sleeve offers more selections than a square without sacrificing structural integrity during high torque operations.

While particular embodiments of the present invention have been illustrated and described, it would be obvious to those skilled in the art that various other changes and modifications can be made without departing from the spirit and scope of the invention. It is therefore, intended to cover in the appended claims all such changes and modifications that are within the scope of this invention.

What I claim is:

1. An extendible tool having a proximal end adapted for attachment to the spindle of a drill and a distal end adapted to engage and securely hold the shank of a drill bit, the tool comprising in combination:

(a) a hollow outer sleeve having an elongate cylindrical outer wall with retractable detent means mounted thereon and a proximal end and a distal end and an axial lumen therebetween wherein said axial lumen has a polygonal cross-section and wherein at least a semispherical portion of said retractable detent means in said cylindrical outer wall projects into said axial lumen; and (b) an elongate shaft having a proximal end and a distal end and a body portion therebetween wherein said shaft has a polygonal cross-section dimensioned to be matingly received and slideably disposed within said polygonal axial lumen of said outer sleeve wherein said proximal end of said shaft is adapted to lockingly and releasably engage the spindle of the drill and wherein the surface of said body portion of said shaft comprises a plurality of planar surfaces wherein the angle between adjacent planar surfaces is equal to 360 degrees divided by the number of edges on said polygonal cross-section and wherein each said planar surface has at least one detent rest comprising a semispherical indentation dimensioned to matingly accommodate said semispherical portion of said retractable detent therein.

2. The extendible tool of claim 1 further comprising a collet slideably mounted upon said outer wall of said outer sleeve, said collet being operable for releasing said semispherical portion of said retractable detent from within said semispherical indentation in response to axial movement thereof.

3. The extendible tool of claim 1 wherein said polygon is a hexagon.

4. The extendible tool of claim 2 wherein said polygon is a hexagon.

* * * * *